April 29, 1941.   W. O. GEYER   2,240,070
THERMOMETER
Filed April 9, 1940

INVENTOR
William O. Geyer
BY
ATTORNEY

Patented Apr. 29, 1941

2,240,070

UNITED STATES PATENT OFFICE 2,240,070

THERMOMETER

William O. Geyer, Bloomfield, N. J.

Application April 9, 1940, Serial No. 328,650

3 Claims. (Cl. 73—343)

This invention relates to an improvement in thermometers for use in combination or association with various types of chemical apparatus. More particularly the invention relates to an improved means associated with said thermometer whereby the same may be more efficiently and effectively assembled in combination with said chemical apparatus and in hermetic sealed relation thereto. The object of the invention is to provide an improved means for detachably securing a thermometer in hermetic sealed relation to and within chemical apparatus. Another object is to provide a thermometer with means to detachably secure the same in association with chemical apparatus in a ball and socket joint. Other objects and advantages will be apparent as the invention is more fully hereinafter disclosed.

In accordance with these objects I have devised the improved means and thermometer combined therewith that is illustrated in the accompanying drawing, wherein.

Figure 1:
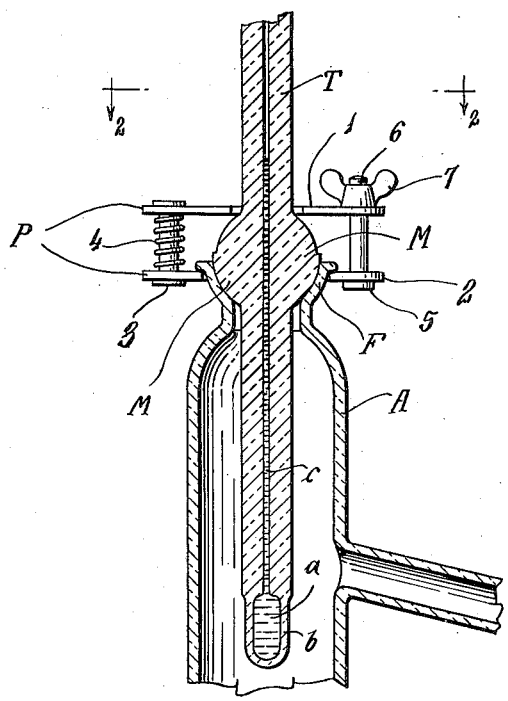
Fig. 1 is a side elevational view in section of the improved thermometer and sealing means therefor of the present invention, illustrating the same in sealed position within chemical apparatus.
Figure 3:
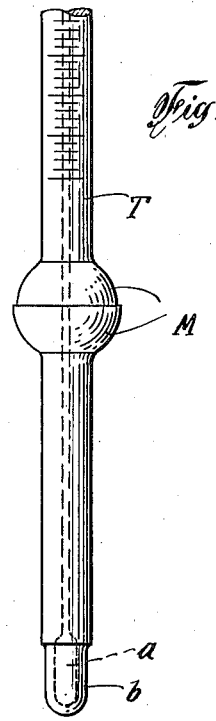
Fig. 3 is a side elevation of the thermometer improved in accordance with the present invention.
Figure 2:
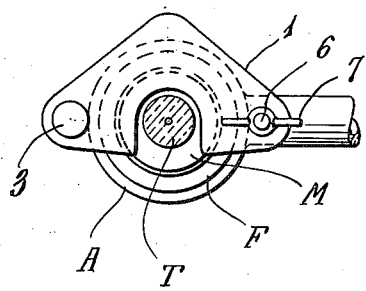
Fig. 2 is a top view of the same.
Figure 4:
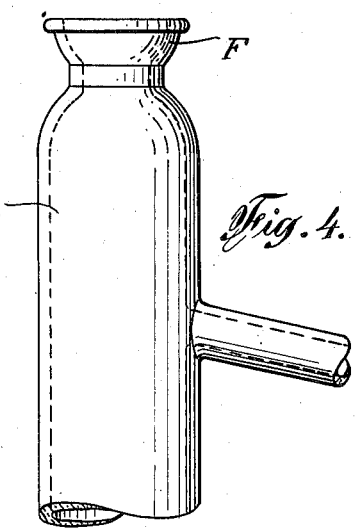
Fig. 4 is a side elevation of the apparatus element adapted to coact therewith.

Referring to the drawing, the thermometer T comprised of glass and having the usual bulb end $b$ and center capillary passageway $c$ filled with mercury $a$ is provided with a spherical shaped portion M, the bottom area of which is provided with a ground surface adapting the same to seat within the cup shaped socket opening F of chemical apparatus element A, and clamp means P is provided to secure the same in seated position within the said opening F. Clamp means P comprises collar members 1 and 2 pivotally and loosely mounted at one end on pin 3 with spring means 4 to maintain the members in desired spaced relation. The opposite ends of collars 1 and 2 are loosely secured together by pin 5 having a threaded end 6 extending beyond the collars 1 and 2 and wing nut means 7 is threaded on said end 6 whereby the said collars 1 and 2 may be actuated towards and away from each other, clamping therebetween the members M and F of the ball and socket joint. Other clamp means P may be employed to obtain the same result without departure from the present invention.

The ball and socket joint obtained by means M coacting with means F under pressure, exerted by means P has many advantages over the sealed joint means heretofore proposed in the art. The joint is substantially non-freezing and may be readily broken upon the release of the pressure applied by means P. Further it provides for the rotational adjustment of bulb end ($b$) within the container A, an adjustment that is of great importance in many processes to ascertain zone temperature variations within the container A, particularly where container A is globular rather than cylindrical as shown. Moreover by providing a plurality of thermometers T with spherical part M located at graduated distances above bulb end ($b$) accurate location of bulb end ($b$) at the desired horizontal level in apparatus A may be obtained without great difficulty.

From the above description of the present invention, it is believed apparent that the same may be widely varied and modified without substantial departure therefrom and all such are contemplated as may fall within the scope of the following claims.

What I claim is:

1. In a thermometer for use in combination with chemical apparatus, a stopper means sealed thereto at a point above its bulb end but below the indication portion thereof, said means comprising one of the ball and socket elements of a male and female joint.

2. In a thermometer for use in combination with chemical apparatus, a spherical shaped stopper means sealed thereto at a point above its bulb end but below the indication portion thereof, the bottom portion of said stopper means being provided with a ground surface adapting the same to seat within a complementary shaped socket opening in the said chemical apparatus.

3. In combination, a chemical apparatus provided with a thermometer opening in one wall thereof, said opening being shaped to provide a socket seat for a ball and socket joint, and a thermometer provided with a ball-shaped stopper integral therewith at a point above its bulb end but below the indication portion thereof, the bottom portion of the said ball extension being ground to seat within said socket, and clamp means for securing the thermometer in seated position.

WILLIAM O. GEYER.